Patented Nov. 2, 1937

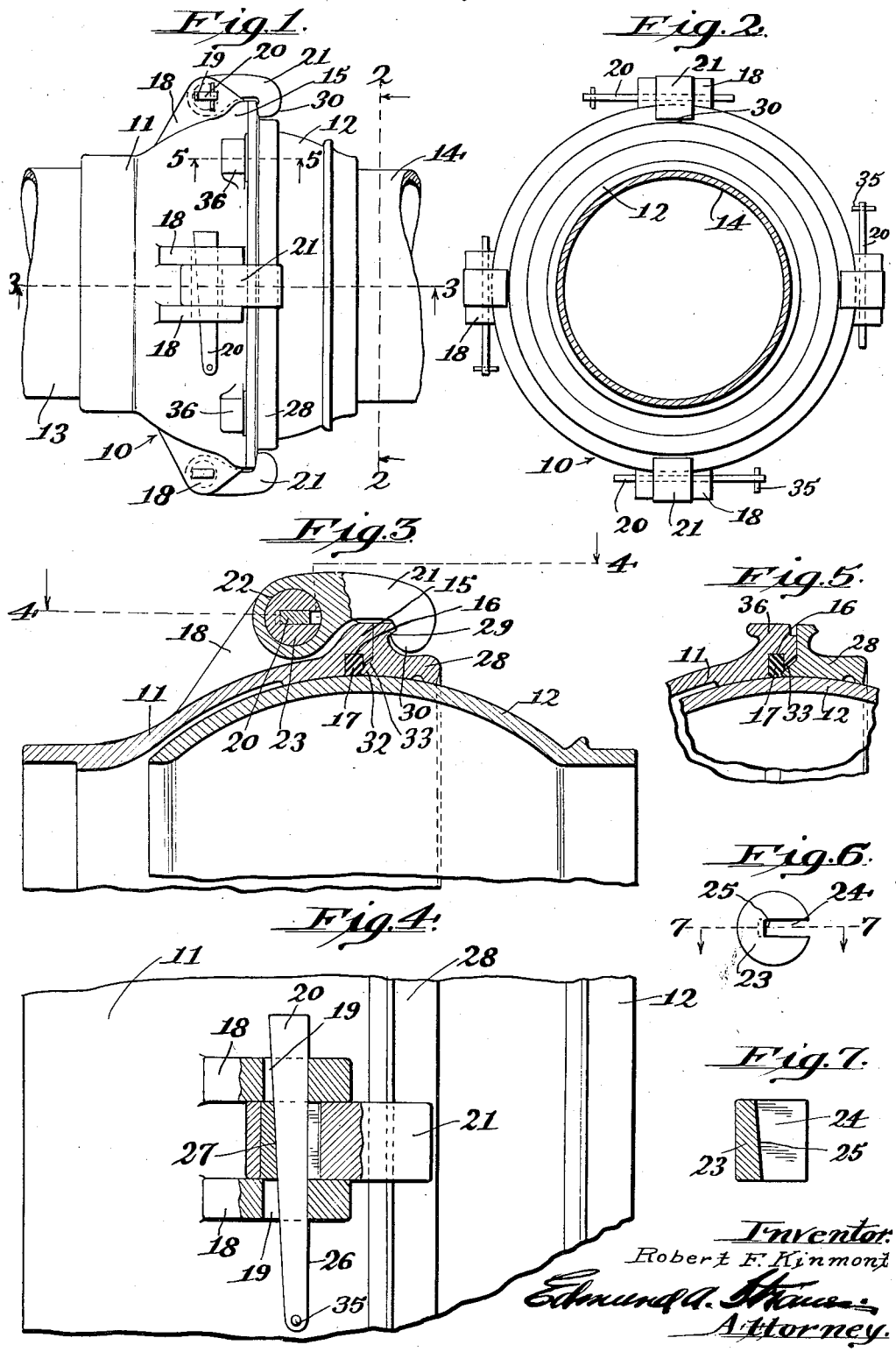

2,098,188

UNITED STATES PATENT OFFICE 2,098,188

BALL JOINT

Robert F. Kinmont, Los Angeles, Calif.

Application May 9, 1936, Serial No. 78,887

5 Claims. (Cl. 285—91)

This invention relates more specifically to a simple mechanism for quickly and readily attaching or detaching members of a ball joint without employing bolts, nuts or similar securing means.

An important object of my invention is to provide an attaching means for ball joints of pipe lines that will permit of instant coupling or uncoupling of the joints, and when coupled together will maintain a perfect leakproof joint.

Another object is to provide a ball joint coupling having an adjustable latching means connected thereto, with means formed thereon for initially forcing the ball members of the joint together prior to a final latching operation.

Still a further object is to provide a ball joint connection for pipe lines that is of simple construction, the parts of the latching mechanism being secured on one of the joint members so that they will not become accidently disconnected therefrom.

I accomplish the above and other objects by means of the mechanism described in the following specification, reference being had to the drawing accompanying the same, in which Fig. 1 is a side elevation of a ball joint in connected relation.

Fig. 2 is an end elevation of the joint looking in the direction indicated by the arrows 2—2 in Fig. 1.

Fig. 3 is an enlarged detail longitudinal section through the joint taken on line 3—3 of Fig. 1.

Fig. 4 is an enlarged detail section of the latch adjusting and securing means.

Fig. 5 is a detail cross section taken on line 5—5 of Fig. 1 showing the means employed in forcing the joint members together prior to securing the same in latched relation.

Fig. 6 is an end view of one of the latch bushings.

Fig. 7 is a longitudinal section of the same taken on line 7—7 of Fig. 6.

Heretofore ball joints employed in connection with dredger pipe lines have been secured together in adjusted relation by means of nuts and bolts, and as the pipe lines from dredgers are usually exposed to moisture, oftentimes being supported on pontoons along and over water ways, the nuts and bolts corrode so badly that when it is desired to lengthen the line or to remove sections therefrom it is oftentimes difficult to disengage the same, such disconnecting operation consuming a great deal of time with consequent excessive expense in necessitating the stoppage of the operation of the dredger until the connections in the pipe lines are completed. By means of my securing mechanism the joints may be readily connected or disconnected in a minimum space of time and consequent expense entailed in forming connections in the pipe lines.

Referring now more particularly to the drawing, 10 designates the complete assembled joint, which consists of two semi-globular hollow members 11 and 12, nested one within the other, the pipe lines 13, 14, being welded or otherwise secured to the outer ends of said joint members. Joint member 11 is provided at its unconnected end with a thickened annular portion 15, in order to provide sufficient metal at that point to form an inner annular recess 16, for the reception of a packing ring 17, formed of rubber or other suitable packing material, to form a leakproof joint between the members when the joint members are in assembled relation.

Formed to the rear of the outer annular edge of ball member 11, and on its exterior surface are a plurality of pairs of bearing lugs 18, each pair spaced apart, and preferably arranged on the right angled diameters of said member. Each pair of lugs is provided with slots 19 for the passage therethrough of flat locking wedges 20, whose functions will be hereinafter described.

Mounted between each pair of bearing lugs are latches 21, each provided with a circular bore 22, in which is mounted a heat treated cylindrical metal bushing 23 having a slot 24, whose bottom wall 25 is inclined from the vertical. The latches are held in adjustable relation by flat wedges 20, one of their edges 26 being vertical, and their oppositely disposed edges 27 being inclined.

Detachably mounted on member 12 of the joint is an annular ring 28 having an inturned flange 29 on its upper end for engagement of the hooked ends 30 of the latches, while its forward lower end is formed into an annular edge or tongue 32 adapted to enter the cut away portion of the annular recess 16 to engage the packing ring and force the same into leakproof engagement with member 12 of the joint when the latches are in operative position as shown in Figs. 1 and 3.

When the latches are in assembled and locked condition the vertical edges 26 of the wedges 20 will engage the forward end walls of the slots 19 formed in the bearing lugs while the inclined edges 27 will engage the inclined wall 25 of the slot formed in the bushing. As the greatest width of the wedges is less than the width of the slots of the bearing lugs it will be clear that when in place and "driven home" that the latches will be drawn rearwardly forcing the annular ring 28 on the joint member against the annular end 15 of the outer joint member 11, the annular edge or tongue 32 entering the cut away portion of the packing recess and forcing the packing ring into positive and leakproof engagement with the inner joint member 12. In order that the wedges 20 will not become disconnected from the latches, pins 35 are rigidly secured in their tapered ends as shown in the various figures of the drawing.

In order to initially bring the ring 28 into contact with the vertical face of the thickened portion of the outer joint member when it is desired to connect the same, I have provided between each pair of bearing lugs a hooked lug 36, a suitable tool known to the trade as "Leverage-Comealong" (not shown) engaging the hooks of the lugs and the inturned flange of the ring 28, to draw the ring 28 in contact with the annular end 15 of the outer joint member. When this has been accomplished the hooks are swung on the cylindrical bushings into engagement with the inturned flanges 29 of the ring 28 and the wedges 20 are driven in to force the latches rearwardly and into tight engagement with the thickened annular portion 15 of the joint member 11.

From the above description it will be apparent that I have provided a latching mechanism for ball joints that will effectively and quickly connect the members of ball joints in leakproof engagement with each other.

While I have illustrated and described with particularity only a single preferred form of my invention, I desire it to be understood that I am not limited to the exact structure illustrated and described; but intend to cover all forms and arrangements which come within the definition of my invention as set forth in the appended claims.

I claim:

1. A device for securing the members of a ball joint in fluidtight engagement, comprising outer and inner joint members nested together, a plurality of pivoted latches mounted in bearings on the outer joint member for engaging the inner joint member, and wedges engaging the pivots and bearings of the latches for forcing the latches into locked engagement with the inner member.

2. A device of the class described comprising a ball joint including a pair of inner and outer members mounted one within the other, the outer member being provided with an internal annular packing ring at its outer end, a plurality of latching dogs pivotally mounted in bearings on said outer member, pivot pins mounted in said latching dogs, a movable latch engaging ring disposed on said inner member, and means engaging the pivot pins and bearings of said latching dogs to move the same into or out of engagement with the latch engaging ring to compress the packing ring into fluidtight engagement with the inner member.

3. A device for securing ball joint members together comprising a pair of substantially spherical hollow members nested together, the outer of said members being provided with an annular packing ring on its inner surface at its outer end, a latch engaging ring mounted on the inner member, a plurality of pivoted latches having bushings mounted between bearings on the outer member adapted to engage the latch engaging ring, the bearings and bushings having slots formed therein, and a wedge associated with the pivot bushings and their bearings to engage the slots in the bushings and bearings to force the latch ring into engagement with the latch engaging ring.

4. A pipe joint comprising a ball section and a socket section, a plurality of latches having hooked outer ends, bushings having openings therein mounted in the ends of the latches opposite their hooked ends, a plurality of bearing lugs having openings arranged in pairs formed on said socket member, the latches being disposed between each pair of bearing lugs and mounted on said bushings, and a wedge member engaging the openings in the bushings and bearing lugs for moving the latches longitudinally.

5. A pipe joint comprising ball and socket sections nested together, a plurality of bearing lugs arranged in pairs mounted on said socket section, said lugs having slots formed therein, a plurality of latches each having a circular opening formed therein, slotted bushings mounted in the circular openings of the latches, said latches being swingingly mounted on the bushings, and a wedge member disposed in the slots of said bushings and said bearing lugs to move the latch members longitudinally.

R. F. KINMONT.